United States Patent
Araki et al.

(10) Patent No.: US 8,803,395 B2
(45) Date of Patent: Aug. 12, 2014

(54) ROTOR

(75) Inventors: Shintarou Araki, Osaka (JP); Akio Yamagiwa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 351 days.

(21) Appl. No.: 13/386,130

(22) PCT Filed: Jul. 9, 2010

(86) PCT No.: PCT/JP2010/061688
§ 371 (c)(1),
(2), (4) Date: Jan. 20, 2012

(87) PCT Pub. No.: WO2011/010565
PCT Pub. Date: Jan. 27, 2011

(65) Prior Publication Data
US 2012/0112593 A1   May 10, 2012

(30) Foreign Application Priority Data

Jul. 23, 2009  (JP) .................................. 2009-172013
Aug. 28, 2009  (JP) .................................. 2009-198315

(51) Int. Cl.
*H02K 21/12* (2006.01)
*H02K 1/27* (2006.01)
*H02K 29/03* (2006.01)

(52) U.S. Cl.
CPC .............. *H02K 1/276* (2013.01); *H02K 1/2766* (2013.01); *H02K 29/03* (2013.01)
USPC ............ 310/156.57; 310/156.56; 310/156.53; 310/216.094

(58) Field of Classification Search
CPC ...... H02K 1/2766; H02K 1/276; H02K 29/03
USPC ............ 310/156.53, 156.56–156.57, 216.094
See application file for complete search history.

(56) References Cited

U.S. PATENT DOCUMENTS

| 7,932,658 B2 * | 4/2011 | Ionel ........................ 310/156.52 |
| 8,405,271 B2 * | 3/2013 | Lee et al. .................. 310/156.57 |
| 8,513,850 B2 * | 8/2013 | Evans et al. .............. 310/156.53 |

(Continued)

FOREIGN PATENT DOCUMENTS

| JP | 2000-295805 A | 10/2000 |
| JP | 2002-252947 A | 9/2002 |
| JP | 2005-176424 A | 6/2005 |
| JP | 2006-115613 A | 4/2006 |
| JP | 2006-238667 A | 9/2006 |
| JP | 2007-97387 A | 4/2007 |
| JP | 2009-27852 A | 2/2009 |
| JP | 4661972 B2 | 1/2011 |

OTHER PUBLICATIONS

International Preliminary Report on Patentability of corresponding International Application No. PCT/JP2010/061688.

*Primary Examiner* — Thanh Lam
(74) *Attorney, Agent, or Firm* — Global IP Counselors

(57) ABSTRACT

A rotor includes a plurality of permanent magnets arranged annularly around an axis and a rotor core. The rotor core includes 2N (where N is a natural number) magnetic pole faces and a plurality of magnetic barriers. The 2N magnetic pole faces produce, due to the plurality of permanent magnets, magnetic poles in a radial direction in such a manner that different polarities can be alternately produced around the axis. The magnetic barriers are provided at a side close to the magnetic pole faces relative to the permanent magnets. At least one of the magnetic barriers is provided in each region obtained by equally dividing the rotor core into (2N+1), ((N+1)×2) or ((N−1)×2) angles around the axis.

3 Claims, 14 Drawing Sheets

(56) References Cited

U.S. PATENT DOCUMENTS

| | | |
|---|---|---|
| 8,664,823 B2 * | 3/2014 | Vyas et al. ............... 310/156.53 |
| 2002/0175584 A1 * | 11/2002 | Koharagi et al. ........ 310/156.56 |
| 2007/0152527 A1 * | 7/2007 | Yura et al. ................ 310/156.53 |
| 2008/0224558 A1 * | 9/2008 | Ionel ........................ 310/156.57 |
| 2009/0134732 A1 * | 5/2009 | Shichijoh et al. ........ 310/156.53 |
| 2009/0261679 A1 | 10/2009 | Sakai et al. |
| 2010/0194228 A1 * | 8/2010 | Lee et al. ................. 310/156.53 |
| 2012/0112593 A1 | 5/2012 | Araki et al. |

* cited by examiner

F I G. 1 7
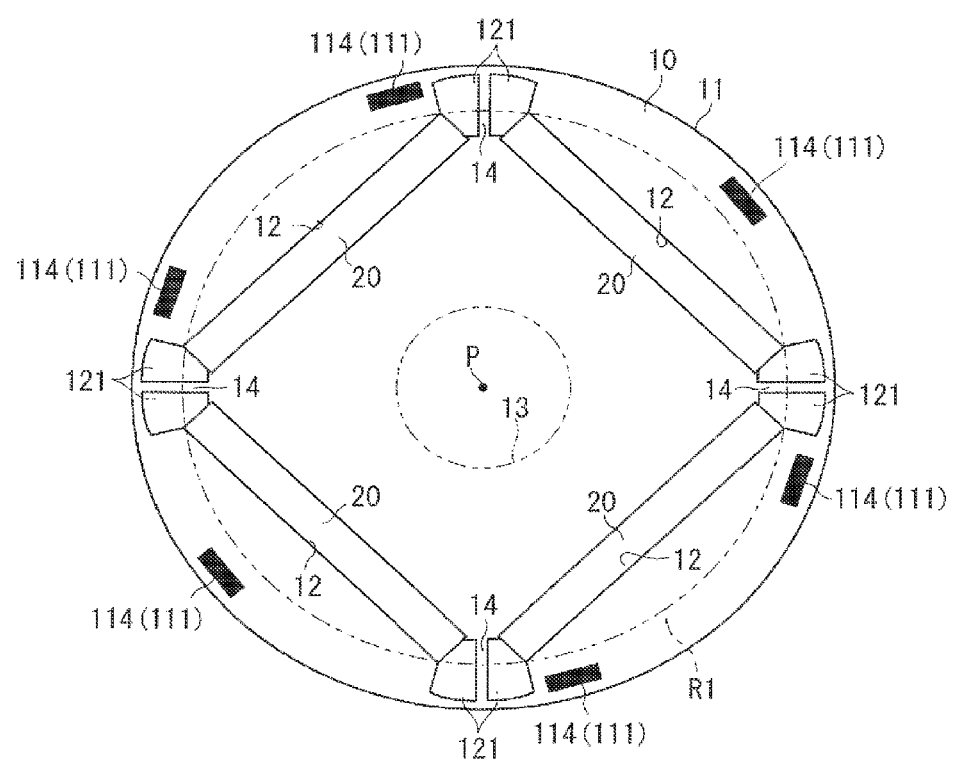

F I G . 1 8
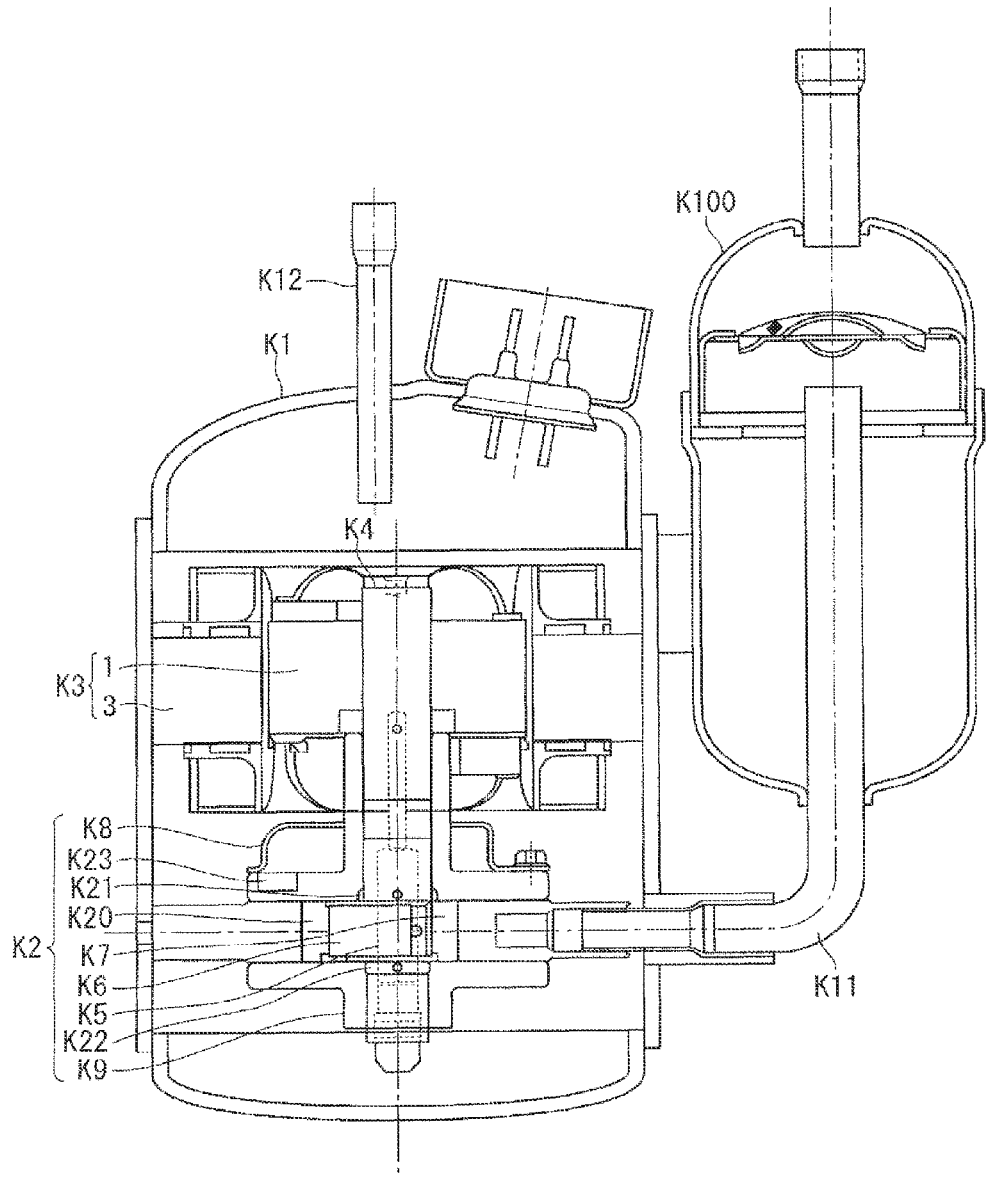

US 8,803,395 B2

ROTOR

CROSS-REFERENCE TO RELATED APPLICATIONS

This national phase application claims priority to Japanese Patent Application Nos. 2009-172013 filed on Jul. 23, 2009 and 2009-198315 filed on Aug. 28, 2009. The entire disclosure of Japanese Patent Application Nos. 2009-172013 and 2009-198315 is hereby incorporated herein by reference.

TECHNICAL FIELD

The present invention relates to a rotor, and particularly to a shape of a rotor core.

BACKGROUND ART

Japanese Patent Application No. 2005-52825 discloses a rotor in which a cogging torque is reduced and additionally a harmonic content in an induced voltage is reduced to thereby reduce a vibration and a noise. The rotor includes a rotor core and a plurality of permanent magnets. The plurality of permanent magnets is arranged annularly around a rotation axis. The plurality of permanent magnets is 15 embedded in the rotor core. The diameter of an outer circumferential side surface of the rotor core decreases at both ends of the permanent magnets.

SUMMARY

However, Japanese Patent Application No. 2005-52825 gives no consideration to a vibration caused by a whirling motion of the rotor, and cannot reduce 20 the vibration. Herein, the whirling motion of the rotor means a phenomenon in which a center of the rotor rotates around a center of the stator due to misalignment between the center of the rotor and the center of the stator.

The whirling motion enhances an electromagnetic force in a direction of the diameter, thus causing an increase in the vibration.

Therefore, an object of the present invention is to provide a rotor capable of suppressing a vibration which may otherwise be caused by a whirling motion of the rotor.

A first aspect of a rotor according to the present invention includes: a plurality of permanent magnets (20) arranged annularly around a predetermined axis (P); and a rotor core (10) including 2N (N is a natural number) magnetic pole faces (11) and a plurality of magnetic barriers, the 2N magnetic pole faces producing, due to the plurality of permanent magnets, magnetic poles in a radial direction centered on the axis, the magnetic poles producing different polarities alternately around the axis, wherein the plurality of magnetic barriers are provided at a side close to the magnetic pole faces relative to the plurality of permanent magnets, and at least one of the plurality of magnetic barriers exists in each of region obtained by equally dividing the rotor core into (2N+1) in angle around the axis.

A second aspect of a rotor according to the present invention includes: a plurality of permanent magnets (20) arranged annularly around a predetermined axis (P); and a rotor core (10) including 2N (N is a natural number) magnetic pole faces (11) and a plurality of magnetic barriers, the 2N magnetic pole faces producing, due to the plurality of permanent magnets, magnetic poles in a radial direction centered on the axis, the magnetic poles producing different polarities alternately around the axis, wherein the plurality of magnetic barriers are provided at a side close to the magnetic pole faces relative to the permanent magnets, and at least one of the plurality of magnetic barriers exists in each of region obtained by equally dividing the rotor core into ((N+1)×2) in angle around the axis.

A third aspect of a rotor according to the present invention includes: a plurality of permanent magnets (20) arranged annularly around a predetermined axis (P); and a rotor core including 2N (N is a natural number equal to or greater than three) magnetic pole faces (11) and a plurality of magnetic barriers (111), the 2N magnetic pole faces producing, due to the plurality of permanent magnets, magnetic poles in a radial direction centered on the axis, the magnetic poles producing different polarities alternately around the axis, wherein the plurality of magnetic barriers are provided at a side close to the magnetic pole faces relative to the plurality of permanent magnets, and at least one of the plurality of magnetic barriers exists in each of region obtained by equally dividing the rotor core into ((N−1)×2) in angle around the axis.

A fourth aspect of a rotor according to the present invention is the rotor according to any one of the first to third aspects, in which the plurality of magnetic barriers (111) are provided at regular intervals in a circumferential direction centered on the axis (P).

A fifth aspect of a rotor according to the present invention is the rotor according to any one of the first to fourth aspects, in which the plurality of magnetic barriers (111) are configured as groove portions (112) provided on the magnetic pole faces.

A sixth aspect of a rotor according to the present invention is the rotor according to any one of the first to fourth aspects, in which the plurality of magnetic barriers (111) are configured as non-magnetic materials (113) provided between the plurality of permanent magnets and the magnetic pole faces.

A seventh aspect of a rotor according to the present invention is the rotor according to any one of the first to fourth aspects, in which: the rotor core includes a plurality of electromagnetic steel plates stacked in a direction extending along the axis (P); concavities and convexities (114) engageable with each other in the direction extending along the axis are formed in at least two of the plurality of electromagnetic steel plates, the concavities and convexities functioning as the magnetic barriers (111).

An eighth aspect of a rotor according to the present invention is the rotor according to the sixth or seventh aspect, in which the plurality of magnetic barriers (111) are provided at a side opposite to the axis (P) relative to, among circles passing through the plurality of permanent magnets (20), a circle (R1) having the largest diameter.

In the first aspect of the rotor according to the present invention, a rotary electric machine is achieved by arranging a stator so as to face the magnetic pole faces with an air gap interposed therebetween in the direction of the diameter.

In the rotary electric machine, the rotor core has at least one magnetic barrier that is provided in each of the regions obtained by equally dividing the angle of the rotor core into (2N+1) angles around the axis. This magnetic barrier enables reduction of a (2N+1)th harmonic component of an electromagnetic force.

The (2N+1)th harmonic component of the electromagnetic force is caused by a whirling motion of the rotor, and is more likely to cause vibrations than harmonic components of other orders of the electromagnetic force. The rotary electric machine including the rotor can efficiently reduce the vibrations.

In the second aspect of the rotor according to the present invention, a rotary electric machine is achieved by arranging a stator so as to face the magnetic pole faces with an air gap interposed therebetween in the direction of the diameter.

In the rotary electric machine, the rotor core has at least one magnetic barrier that is provided in each of the regions obtained by equally dividing the angle of the rotor core into ((N+1)×2) angles around the axis. Therefore, the magnetic barrier is provided near a position corresponding to a cycle of an (N+1)th harmonic component of a magnetic flux density that is supplied from the rotor to the stator (a fundamental wave is set to be a sine wave in which one cycle corresponds to one-round around the axis as the center). Thus, the (N+1)th harmonic component can be reduced in a relatively balanced manner.

The (N+1)th harmonic component is caused by the whirling motion of the rotor. This harmonic component enhances a (2N+1)th-order electromagnetic vibrating force. The (2N+1)th-order electromagnetic vibrating force is a main factor in an increase of the vibrations. Here, the (N+1)th harmonic component of the magnetic flux density can be reduced, and therefore vibrations caused by the whirling motion of the rotor can be reduced more efficiently.

In the third aspect of the rotor according to the present invention, a rotary electric machine is achieved by arranging a stator so as to face the magnetic pole faces with an air gap interposed therebetween in the direction of the diameter.

In the rotary electric machine, the rotor core has at least one magnetic barrier that is provided in each of the regions obtained by equally dividing the angle of the rotor core into ((N−1)×2) angles around the axis. Therefore, the magnetic barrier is provided near a position corresponding to a cycle of an (N−1)th harmonic component of a magnetic flux density that is supplied from the rotor to the stator (a fundamental wave is set to be a sine wave in which one cycle corresponds to one-round around the axis as the center). Thus, the (N−1)th harmonic component can be reduced in a relatively balanced manner. Since the (N−1)th harmonic component is caused by the whirling motion of the rotor, vibrations caused by the whirling motion of the rotor can be reduced.

In the fourth aspect of the rotor according to the present invention, the magnetic barrier is provided at the position corresponding to a cycle of the (2N+1)th harmonic component of the electromagnetic force. This can appropriately reduce the (2N+1)th harmonic component of the electromagnetic force. Alternatively, the magnetic barrier is provided at the position corresponding to the cycle of the (N±1)th harmonic components of the magnetic flux density. This can appropriately reduce the (N±1)th harmonic components of the magnetic flux density.

In the fifth aspect of the rotor according to the present invention, the air gap between the rotor and the stator can be increased at a position where the groove portion is provided. Thus, the groove portion can function as the magnetic barrier.

In the sixth aspect of the rotor according to the present invention, the magnetic barriers are provided at a distance from the magnetic pole faces, and therefore the magnetic barriers do not hinder measurement of the air gap between a side surface (magnetic pole faces) of the rotor and the stator. Thus, the air gap can be measured irrespective of the positions of the magnetic barriers.

In the seventh aspect of the rotor according to the present invention, the magnetic barriers exhibit a function for fixing the electromagnetic steel plates and a function as the magnetic barriers. This can reduce manufacturing costs, as compared with providing a special fixing part and a special magnetic barrier for exhibiting the respective functions.

In the eighth aspect of the rotor according to the present invention, the amount of reduction of the (2N+1)th harmonic component of the electromagnetic force that is reduced by the magnetic barriers can be increased. Alternatively, the amount of reduction of the (2N±1)th harmonic components of the magnetic flux density can be increased.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a cross-sectional view conceptually showing a configuration of the rotor according to the third embodiment; and FIG. 18 is a cross-sectional view conceptually showing a configuration of a compressor provided with a motor that includes the rotor.

DESCRIPTION OF THE EMBODIMENTS

First Embodiment
<Configuration of Rotor>

Figure 1:
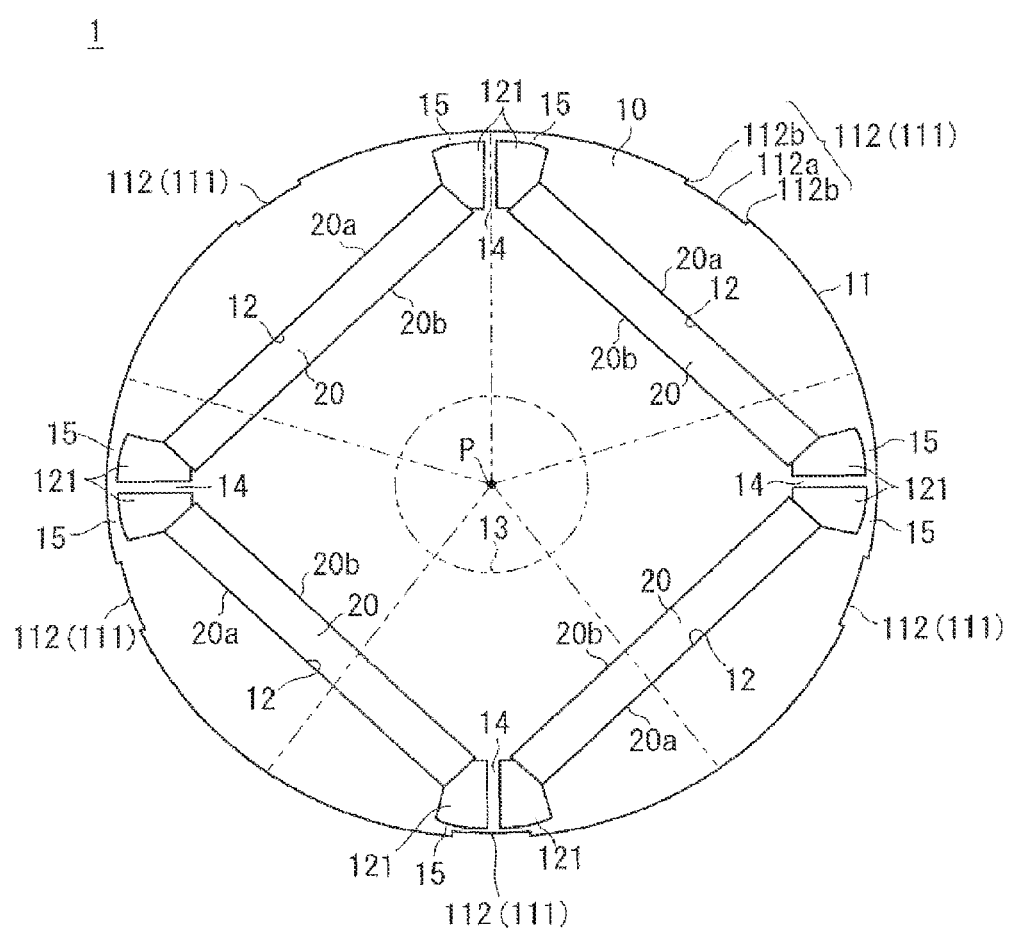
FIG. 1 is a cross-sectional view conceptually showing a configuration of a rotor according to a first embodiment.

FIG. 1 shows a cross-section perpendicular to an axis P (which will be described later) of a rotor 1. As illustrated herein, the rotor 1 includes a rotor core 10 and a plurality of permanent magnets 20.

The plurality of permanent magnets 20 are, for example, rare-earth magnets (such as rare-earth magnets containing neodymium, iron, boron, as a main component), and arranged annularly around the predetermined axis P. In an example shown in FIG. 1, each of the permanent magnets 20 is shaped into a rectangular parallelepiped plate. Each of the permanent magnets 20 is arranged in such a position that, at the center thereof with respect to a direction of a circumference (hereinafter simply referred to as a circumferential direction)

whose center is placed at the axis P, a thickness direction thereof can be coincident with a direction of a diameter (hereinafter simply referred to as a diameter direction) whose center is placed at the axis P. Here, it is not always necessary that each permanent magnet 20 is arranged in the manner shown in FIG. 1. In a possible example, when seen in a direction (hereinafter simply referred to as an axial direction) extending along the axis P, the shape of each permanent magnet 20 may be a V-like shape opening toward the side opposite to the axis P (hereinafter also referred to as an outer circumferential side) or the side close to the axis P (hereinafter also referred to as an inner circumferential side), or may be an arc-like shape opening toward the outer circumferential side or the inner circumferential side.

In the example shown in FIG. 1, any pair of permanent magnets 20 neighboring each other in the circumferential direction are arranged such that their magnetic pole faces 20a facing toward the outer circumferential side have different polarities from each other. This causes each permanent magnet 20 to supply field magnetic fluxes to a stator which is not shown, that is, to function as a so-called field magnet.

Although in the example shown in FIG. 1, four permanent magnets 20 are illustrated (so-called four pole rotor 1), the number of permanent magnets 20 included in the rotor 1 may be two or may be six or more. Although in the example shown in FIG. 1, each of the four permanent magnets 20 forms one field magnetic pole, it may be also acceptable that, for example, a plurality of permanent magnets 20 form one field magnetic pole. In other words, each of the permanent magnets 20 shown in FIG. 1 may be divided into a plurality of permanent magnets.

The rotor core 10 is made of a soft magnetic material (such as iron). In the example shown in FIG. 1, the rotor core 10 has a substantially column-like shape whose center is placed at the axis P.

In the rotor core 10, a plurality of magnet accommodation holes 12 for accommodating the plurality of permanent magnets 20 are bored. Each of the magnet accommodation holes 12 has a shape adapted to the shape and arrangement of each permanent magnet 20. In the example shown in FIG. 1, the number of the magnet accommodation holes 12 bored is four.

At an outer circumferential side surface 11 of the rotor core 10, 2p (p is an integer equal to or greater than one) magnetic pole faces are formed by the permanent magnets 20. The 2p magnetic pole faces produce magnetic poles in the diameter direction such that one polarity and the other polarity can be alternately produced around the axis. In the example shown in FIG. 1, two permanent magnets 20 having the magnetic pole faces 20a of the positive pole form positive magnetic pole faces at the outer circumferential side surface 11, and two permanent magnets 20 having the magnetic pole faces 20a of the negative pole form negative magnetic pole faces at the outer circumferential side surface 11. Thus, in the example shown in FIG. 1, four magnetic pole faces are formed at the outer circumferential side surface 11.

For example, the rotor core 10 may be formed by electromagnetic steel plates being stacked in the axial direction. This can increase an electrical resistance of the rotor core 10 in the axial direction, and therefore can reduce occurrence of eddy currents owing to magnetic fluxes flowing in the rotor core 10. The rotor core 10 may be configured as a dust core having an electrically-insulating material (such as a resin) artificially contained therein. Since an insulating material is contained, the dust core has a relatively high electrical resistance, and therefore occurrence of eddy currents can be reduced.

For example, a shaft through hole 13 having a substantially column-like shape whose center is placed at the axis P may be formed in the rotor core 10. A side surface that forms the shaft through hole 13 may be recognized as an inner circumferential side surface as against the outer circumferential side surface 11. A shaft which is not shown is fitted in the shaft through hole 13, and thereby the rotor core 10 and the shaft are fixed to each other. In a case where the shaft through hole 13 is not formed, for example, end plates (not shown) are provided at both axial sides of the rotor core 10 and the shaft is attached to the end plate.

In the example shown in FIG. 1, in the rotor core 10, voids 121 are bored at both circumferential sides of the permanent magnet 20 that forms one field magnetic pole. The void 121 extends from each side of the permanent magnet 20 to the outer circumferential side. The voids 121 can suppress shunting of magnetic fluxes between the magnetic pole faces 20a at the outer circumferential side and the magnetic pole faces 20b at the inner circumferential side of the permanent magnet 20.

Although in the example shown in FIG. 1, the void 121 is connected to the magnet accommodation hole 12, the void 121 may be spaced apart from the magnet accommodation hole 12. In such a case, a part of the rotor core 10 exists between the void 121 and the magnet accommodation hole 12, and therefore the strength of the rotor core 10 can be improved.

In the example shown in FIG. 1, a rib portion 14 formed as a part of the rotor core 10 exists between the permanent magnets 20 neighboring each other in the circumferential direction. The rib portion 14 can improve so-called q-axis reluctance. Thus, a difference between d-axis reluctance and q-axis reluctance can be increased, which can improve a reluctance torque.

In the example shown in FIG. 1, the rib portion 14 and a core portion (part of the rotor core 10) existing at the outer circumferential side of the permanent magnet 20 are connected to each other at the outer circumferential side of the void 121. This connection portion 15 is also formed as a part of the rotor core 10. This can improve the strength of the rotor core 10. It is desirable that the thickness of the connection portion 15 with respect to the diameter direction is small to a degree allowing the connection portion 15 to be easily magnetically saturated by magnetic fluxes passing through the connection portion 15. This can prevent magnetic fluxes from shunting between the magnetic pole faces 20a and 20b of the permanent magnet 20 through the core portion at the outer circumferential side of the permanent magnet 20, the connection portion 15, the rib portion 14, and a core portion (part of the rotor core 10) at the inner circumferential side of the permanent magnet 20.

The rotor core 10 has magnetic barriers 111. The magnetic barriers 111 are provided at the outer circumferential side surface 11 side relative to the permanent magnets 20. In the example shown in FIG. 1, the magnetic barriers 111 are shown as groove portions 112 formed at the outer circumferential side surface 11. In the example shown in FIG. 1, the groove portion 112 has a surface 112a extending along the circumferential direction, and surfaces 112b extending from both circumferential ends of the surface 112a toward the outer circumferential side in the diameter direction. At the side opposite to the surface 112a, the surfaces 112b are connected to the outer circumferential side surface 11 except the groove portion 112.

At least one of the magnetic barriers 111 (in the example shown in FIG. 1, the groove portions 112) is provided in each of regions obtained by equally dividing the rotor core 10 into (2p+1) in angle around the axis P. In FIG. 1, an example of such regions are shown as regions each sandwiched between adjacent two of the alternate long and two short dashes lines extending radially from the axis P as the center.

In the example shown in FIG. 1, the number of the magnetic barriers 111 provided is equal to a number obtained by adding one to the double of the number p of pairs of magnetic poles (hereinafter referred to as the number of pole pairs) of the rotor 1. The number of pole pairs p of the rotor 1 can be recognized as the number of pairs of the magnetic pole faces formed at the outer circumferential side surface 11 of the rotor core 10. In the example shown in FIG. 1, the number of pole pairs p of the rotor 1 is two, and therefore the number of magnetic barriers 111 provided is five (=2×2+1).

A stator (not shown) is arranged against the rotor 1 such that the stator can face the outer circumferential side surface 11 with an air gap interposed therebetween in the diameter direction. Thus, a rotary electric machine is achieved. Moreover, in the rotor 1, in a case where the rotor 1 is rotated by flowing a current to a coil included in the stator, vibrations caused by a whirling motion of the rotor 1 can be reduced. In the following, a magnetic flux density caused by the whirling motion will be described, and next the reduction of the vibrations will be specifically described.

<Electromagnetic Force Caused by Whirling Motion>

Ideally, the rotor 1 makes a rotating motion around the rotation axis P as the center. Actually, however, a difference occurs between the center of the rotor 1 and the center of the stator, which causes the rotor 1 to concurrently make the whirling motion around the axis P as the center. Herein, the rotating motion means a spinning motion of the rotor 1 around the axis P as the center, and the whirling motion means a revolving motion of the center of the rotor 1 rotating around the axis P as the center.

Figure 2:
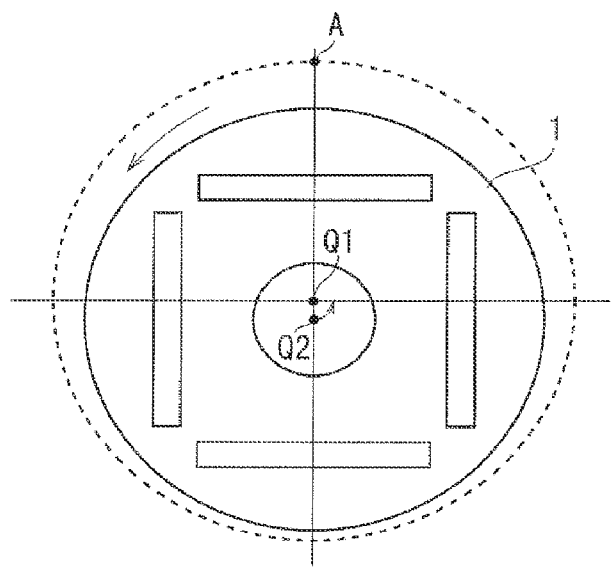
FIG. 2 is a diagram for explaining a whirling motion.

The whirling motion causes a variation of the air gap between the rotor 1 and the stator. For example, a consideration will be given to an air gap in a case where a center Q1 of the rotor 1 is shifted from a center Q2 of the stator in a downward direction of the drawing sheet, as shown in FIG. 2. In FIG. 2, the rotor 1 is more simplified, and a surface of the stator facing the rotor 1 is illustrated with the broken line. Although an actual shift of the center Q1 of the rotor 1 from the center Q2 of the stator is approximately 0.1 mm, the shift is exaggerated in the illustration.

As shown in FIG. 2, the air gap is the largest at the upper side in the drawing sheet, and is the smallest at the lower side in the drawing sheet. At the left and right sides in the drawing sheet, the air gap is substantially identical to an air gap that is obtained when the position of the center Q1 of the rotor 1 and the position of the center Q2 of the stator are coincident with each other.

Figure 3:
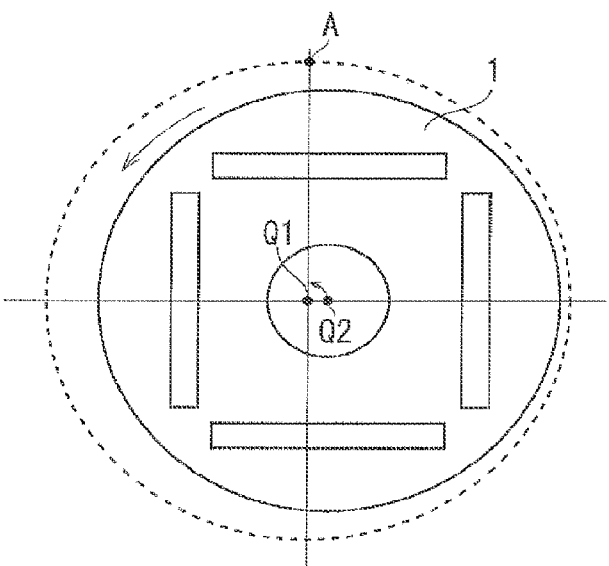
FIG. 3 is a diagram for explaining the whirling motion.

Next, a consideration will be given to how the air gap at a point A located uppermost in the drawing sheet varies when the rotor 1 is rotated. Assuming that a situation where the centers Q1 and Q2 are located at the positions shown in FIG. 2 is an initial position of the rotation, the air gap at the point A initially takes the maximum value. Then, for example, when the rotor 1 is rotated counterclockwise while making the whirling motion, the air gap at the point A decreases. When the rotor 1 is rotated through a rotation angle of 90°, the air gap at the point A is substantially identical to the air gap that is obtained when the center Q1 of the rotor 1 and the center Q2 of the stator are coincident with each other, as shown in FIG. 3.

Figure 4:
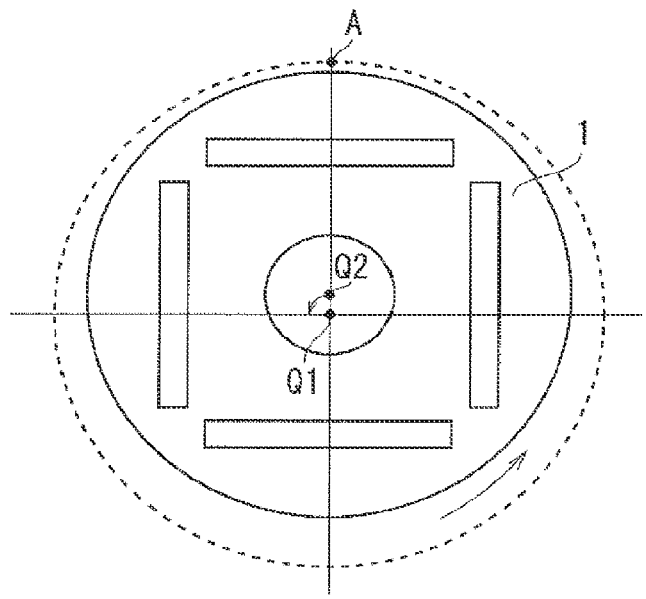
FIG. 4 is a diagram for explaining the whirling motion.
Figure 5:
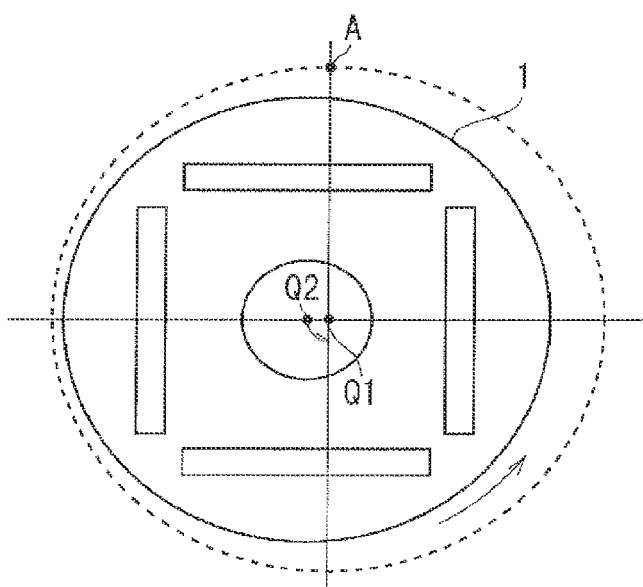
FIG. 5 is a diagram for explaining the whirling motion.

In a subsequent rotation, the air gap at the point A also decreases. Then, when the rotor 1 is rotated through a rotation angle of 180°, the air gap at the point A takes the minimum value, as shown in FIG. 4. In a subsequent rotation, the air gap at the point A increases. When the rotor 1 is rotated through a rotation angle of 270°, the air gap at the point A is substantially identical to an air gap that is obtained when the center Q1 of the rotor 1 and the center Q2 of the stator are coincident with each other, as shown in FIG. 5. In a subsequent rotation, the air gap at the point A also increases. When the rotor 1 is rotated through a rotation angle of 360°, the air gap at the point A takes the maximum value again.

As can be understood from the variation of the air gap at the point A, the air gap at the point A contains a high proportion of a cosine wave component in which a rotation angle of 360° is one cycle.

In consideration of the fact that a magnetic resistance increases as the air gap increases, a permeance varies similarly to the air gap due to the whirling motion of the rotor 1. Accordingly, when the variation of the air gap at the point A is recognized as a cosine wave component, a permeance Rm passing through the point A can be represented by the following expression.

$$Rm = 1 + a \cdot \cos\theta \tag{1}$$

Here, a permeance obtained when the center Q1 of the rotor 1 and the center Q2 of the stator are coincident with each other is standardized as 1. The value a is caused by a distance (shift) between the center Q1 of the rotor and the center Q2 of the stator. As the shift between the center Q1 of the rotor 1 and the center Q2 of the stator is greater, the value a increases.

A magnetomotive force B1 caused by the rotating motion in a case where the center Q1 of the rotor 1 and the center Q2 of the stator are coincident with each other is represented by the following expression.

$$B1 = \cos(p\theta) \tag{2}$$

For simplification, it is assumed that a phase difference between the permeance Rm and the magnetomotive force B1 is zero. The magnetomotive force B1 is recognized with the amplitude of the magnetic flux density being standardized as 1.

A magnetic flux density B2 that flows between the rotor 1 and the stator at the point A is expressed as the product of the magnetomotive force B1 caused by the rotating motion and the permeance Rm that varies due to the whirling motion.

$$\begin{aligned} B2 &= Rm \cdot B1 \\ &= (1 + a \cdot \cos\theta)\cos(p\theta) \\ &= \cos(p\theta) + a/2 \cdot \{\cos(p+1)\theta + \cos(p-1)\theta\} \end{aligned} \tag{3}$$

The value $\cos(p\theta)$ shown in the right side of the expression (3) represents a magnetic flux density caused by the rotating motion. The value $a/2 \cdot \{\cos(p+1)\theta + \cos(p-1)\theta\}$ shown in the right side of the expression (3) represents the magnetic flux density caused by the whirling motion. It is considered that, when the rotor 1 is constantly rotated, the value a takes a constant value irrespective of the angle θ, because of the symmetry of each of the rotor and the stator. Therefore, in the magnetic flux density B2, a (p±1)th harmonic components having, as a fundamental wave, a cosine wave in which a rotation angle of 360° is one cycle is caused by the whirling motion.

Here, it is assumed that the phase difference between the permeance Rm and the magnetic flux density B1 is zero. However, even if the calculation is made with the phase difference being set as φ, it can be derived that the (p±1)th harmonic components are caused in the magnetic flux density B2.

As shown in the expression (2), the permeance Rm caused by the whirling motion is represented by cos θ. Actually, however, harmonic components of a plurality of orders are included. However, as shown in the expression (2), a main component of the variation of the permeance Rm can be represented by cos θ. Thus, the magnetic flux density B2 contains a higher proportion of the (p±1)th harmonic components than harmonic components of other orders. The value cos(pθ) represents a component that contributes to a torque. The magnetic flux density B2 contains the highest proportion of a p-th harmonic component among the harmonic components.

The electromagnetic force is represented by the square of the magnetic flux density B2, and thus the electromagnetic force contains the product of cos(pθ) and cos(p+1)θ, as shown in the following expression.

$$B2^2 = [\cos(p\theta) + a/2 \cdot \{\cos(p+1)\theta + \cos(p-1)\theta\}]^2 \quad (4)$$
$$= \cos^2(p\theta) + a^2/4 \cdot \cos^2(p+1)\theta + a^2/4 \cdot \cos^2(p-1)\theta + a \cdot$$
$$\cos(p\theta)\cos(p+1)\theta + a^2/2 \cdot \cos(p+1)\theta\cos(p-1)\theta + a \cdot$$
$$\cos(p\theta)\cos(p-1)\theta$$

In the expression (1), the value a is considered to be smaller than one. Therefore, the term containing a coefficient of $a^2$ is negligible. Thus, the foregoing expression approximates the formula $\cos^2(p\theta)+a\cdot\{\cos(p\theta)\cos(p+1)\theta+\cos(p\theta)\cos(p-1)\theta\}$. Furthermore, if the product-to-sum formulas for a trigonometric function are applied, the electromagnetic force approximates the following expression.

$$B2^2 = \frac{1}{2}+\cos(2p\theta)/2+a/2\{\cos(2p+1)\theta+\cos(2p-1)\theta+2\cos\theta\} \quad (5)$$

In other words, the electromagnetic force contains the (2p±1)th harmonic components. This is because, as described above, the magnetic flux density B2 contains a larger amount of the p-th harmonic component and the (p±1)th harmonic components than the harmonic components of the other orders. Besides, the (2p±1)th harmonic components of the electromagnetic force are more likely to cause vibrations than the harmonic components of the other orders of the electromagnetic force. Therefore, it has been desired to reduce the (2p±1)th harmonic components of the electromagnetic force.

<Reduction of Vibration>

Figure 6:
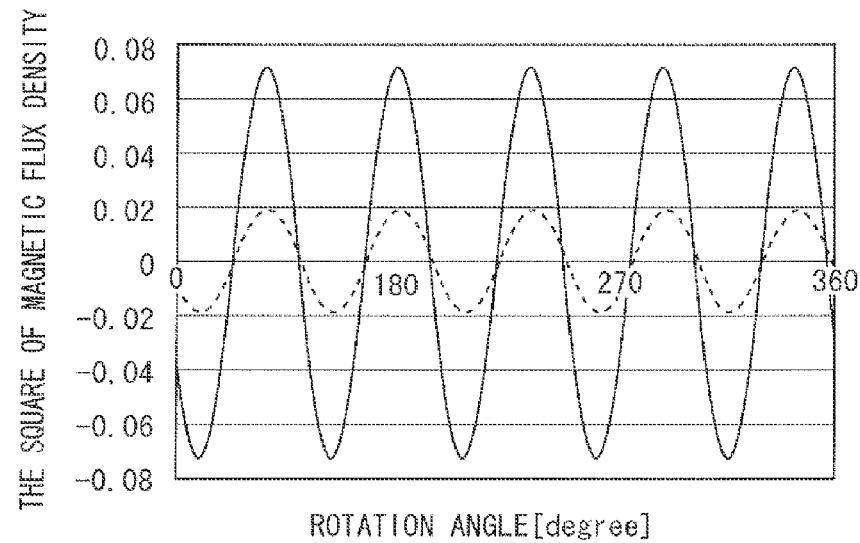
FIG. 6 is a graph showing the square of a magnetic flux density.

FIG. 6 shows an example of a fifth harmonic component of the electromagnetic force obtained by a simulation in the rotor 1. In an example shown in FIG. 6, the fifth harmonic component of the electromagnetic force in a rotor not including the magnetic barriers 111 is indicated by the solid line, while the fifth harmonic component of the electromagnetic force in the rotor 1 of FIG. 1 is indicated by the broken line. As shown in FIG. 6, in the rotor 1 including the magnetic barriers 111, the fifth harmonic component of the electromagnetic force can be reduced. In the example shown in FIG. 6, the amplitude of the fifth harmonic component of the electromagnetic force is reduced to one-third or less.

Figure 7:
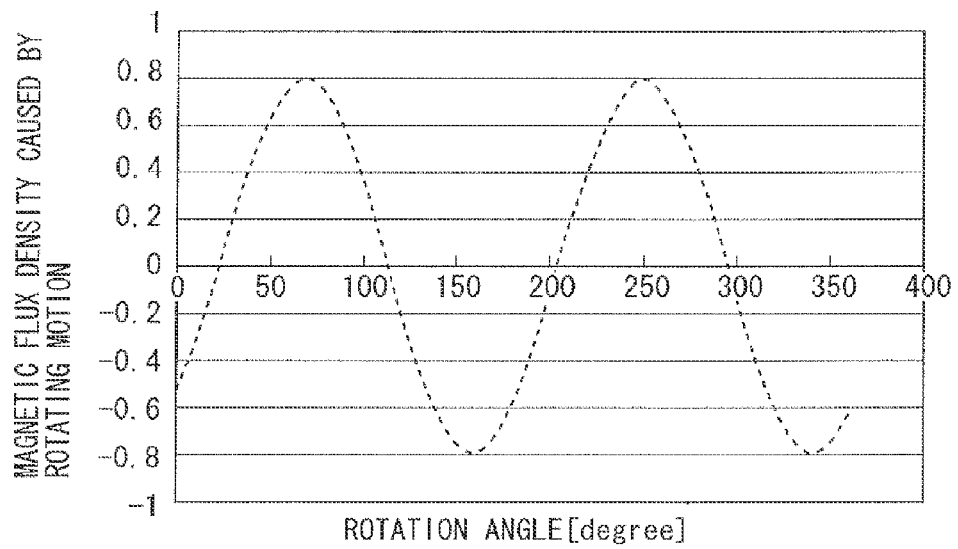
FIG. 7 is a graph showing a component of the magnetic flux density that contributes to a torque.

FIG. 7 shows an example of a component (here, the second harmonic component) of the magnetic flux density B2 that contributes to a torque. In the example shown in FIG. 7, a magnetic flux density in a rotor not including the magnetic barriers 111 is indicated by the solid line, while a magnetic flux density in the rotor 1 of FIG. 1 is indicated by the broken line. As shown in FIG. 7, in the rotor 1 including the magnetic barriers 111, the amplitude of the component that contributes the torque is hardly reduced.

As described above, in the rotor 1, the fifth harmonic component of the electromagnetic force can be reduced while suppressing the reduction of the amplitude of the component that contributes to the torque, as compared with a rotor not including the magnetic barriers 111. The fifth harmonic component of the electromagnetic force, which is caused by the whirling motion of the rotor 1, is a main factor in an increase of vibrations. In the rotor 1, the fifth harmonic component of the electromagnetic force can be reduced, which enables efficient reduction of the vibrations.

Although FIGS. 6 and 7 show results of the rotors in which the number of pole pairs is two, the number of pole pairs is not limited to two. A rotor having (2p+1) magnetic barriers 111 (p represents the number of pole pairs) also can reduce the (2p+1)th harmonic component of the electromagnetic force while suppressing the reduction of the vibrations of the component that contributes to the torque.

In the example shown in FIG. 1, the magnetic barriers 111 are arranged at substantially regular intervals in the circumferential direction. Therefore, the magnetic barriers 111 are provided to correspond to a cycle of the (2p+1)th harmonic component of the electromagnetic force. This can more efficiently reduce the (2p+1)th harmonic component of the electromagnetic force.

Figure 8:
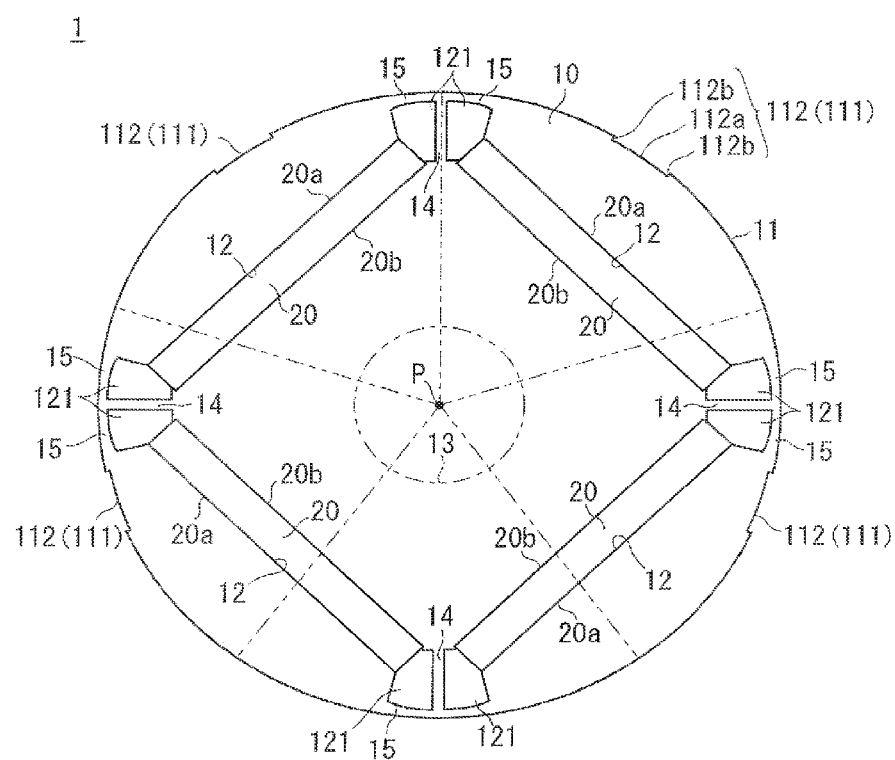
FIG. 8 is a cross-sectional view conceptually showing another example of the configuration of the rotor according to the first embodiment.

The voids 121 may be recognized as the magnetic barriers 111. In an example shown in FIG. 8, the voids 121 existing in one region implement the function of one magnetic barrier 111. In the other four regions, the groove portions 112 implement the function of the magnetic barriers 111. This also can reduce the fifth (=(2p+1)th) harmonic component of the electromagnetic force.

Second Embodiment

Figure 9:
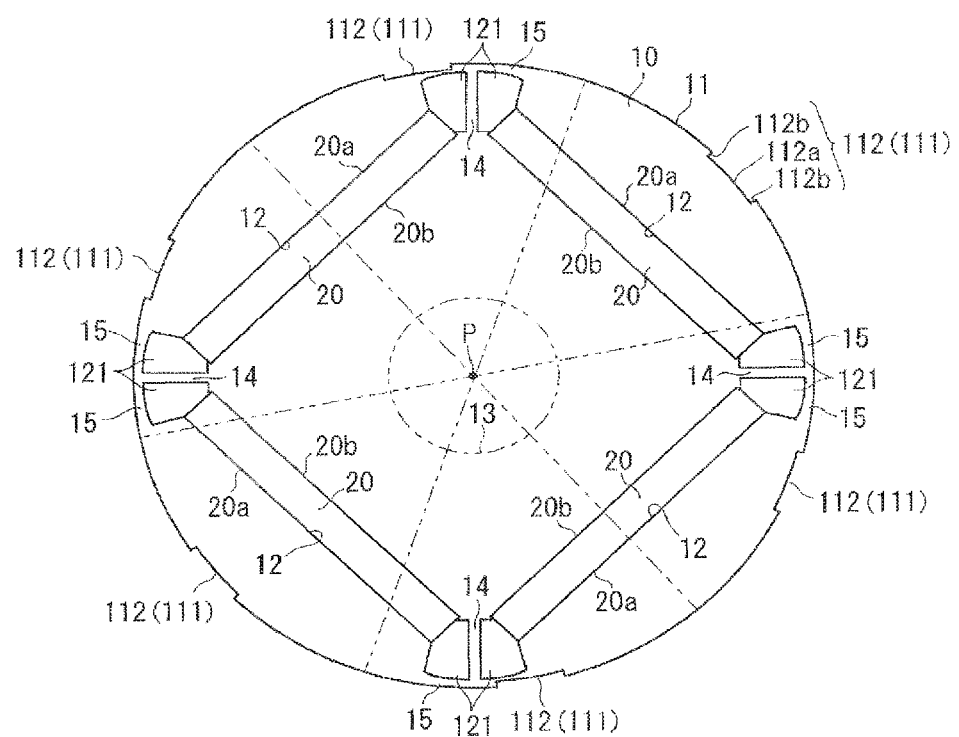
FIG. 9 is a cross-sectional view conceptually showing a configuration of a rotor according to a second embodiment.

A rotor 1 illustrated in FIG. 9 is different from the rotor 1 illustrated in FIG. 1 in terms of the number of the magnetic barriers 111.

In an example shown in FIG. 9, at least one of the magnetic barriers 111 is provided in each of regions obtained by equally dividing the rotor core 10 into ((p+1)×2) in angle around the axis P (in the example shown in FIG. 9, the groove portions 112). In FIG. 9, an example of such regions are shown as regions each sandwiched between adjacent two of the alternate long and two short dashes lines extending radially from the axis P as the center.

As described in the first embodiment above, referring to the expression (3), the p-th harmonic component of the magnetic flux density B2 is caused by the rotating motion of the rotor 1, and is a component that contributes to a torque of a rotary electric machine and does not cause an increase of vibrations. The other harmonic components are components that can be a factor for an electromagnetic force in the diameter direction to cause vibrations. Particularly, an electromagnetic force containing the (2p+1)th order that is the order of the sum of p and p+1 is a relatively great factor in the increase of vibrations. This has been experimentally observed by the applicants of the present application. As can be understood from the expression (4), the (2p+1)th-order electromagnetic force is calculated with the factors of the p-th harmonic component and the (p+1)th harmonic component.

<Reduction of Vibrations>

In the rotor 1 shown in FIG. 9, the {(p+1)×2} magnetic barriers 111 are provided in the regions obtained by equally dividing the rotor core 10 into {(p+1)×2} in angle around the axis P. Thus, the magnetic barriers 111 are provided near a position corresponding to a cycle of the (p+1)th harmonic component of the magnetic flux density B2. Since the magnetic barrier 111 causes an increase of the magnetic resistance, the (p+1)th harmonic component of the magnetic flux density B2 can be reduced in a balanced manner.

In the example shown in FIG. 9, the magnetic barriers 111 are provided at substantially regular intervals in the circumferential direction. Therefore, the magnetic barriers 111 are provided to correspond to the cycle of the (p+1)th harmonic component of the magnetic flux density B2. When the positions of the magnetic barriers 111 are coincident with the positions corresponding to the peak and the trough of the (p+1)th harmonic component, the maximum reduction of the (p+1)th harmonic component can be achieved.

As described above, the (p+1)th harmonic component of the magnetic flux density B2 can be reduced in a balanced manner. Therefore, the (2p+1)th-order electromagnetic force caused by the p-th harmonic component and the (p+1)th harmonic component can be reduced, which can more efficiently reduce the vibrations as compared with reducing another-order harmonic component.

Figure 10:
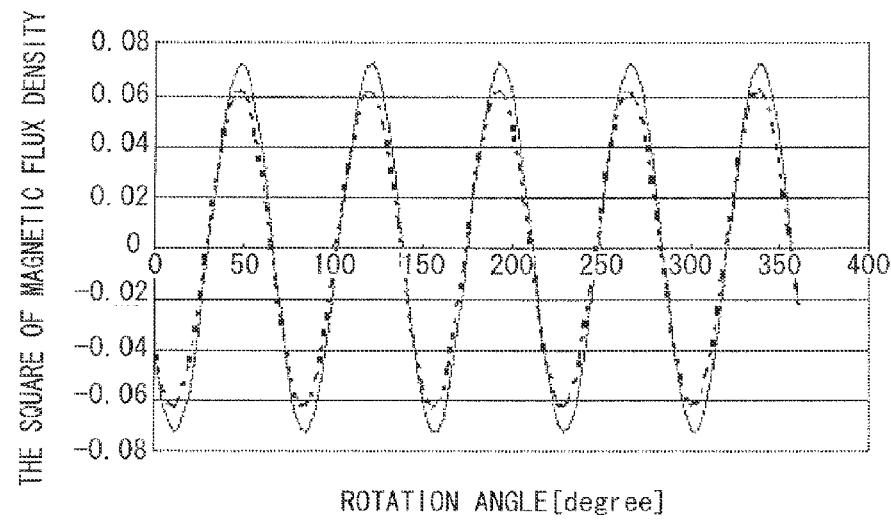
FIG. 10 is a graph showing the square of a magnetic flux density.

FIG. 10 shows the fifth-order electromagnetic force as an example of the square (that is, the electromagnetic force) of the magnetic flux density B2. In the example shown in FIG. 10, the fifth-order electromagnetic force in a rotor not including the magnetic barriers 111 is indicated by the solid line, while the fifth-order electromagnetic force in the rotor 1 of FIG. 9 is indicated by the broken line. As shown in FIG. 10, in the rotor 1 including the magnetic barriers 111, the fifth-order electromagnetic force can be reduced. In the example shown in FIG. 10, the amplitude of the fifth-order electromagnetic force is reduced by about over 10%.

Figure 11:
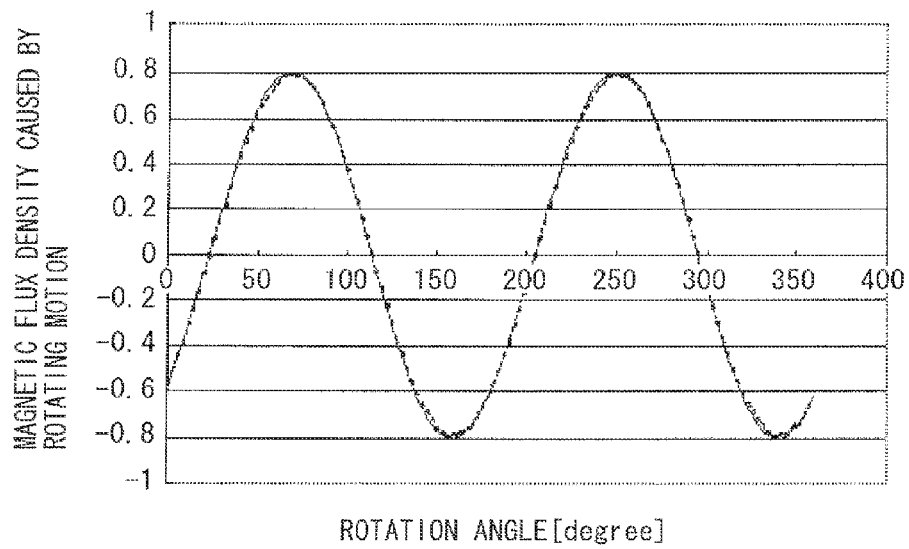
FIG. 11 is a graph showing a component of the magnetic flux density that contributes to a torque.

FIG. 11 shows an example of a component (here, the second harmonic component) of the magnetic flux density B2 that contributes to a torque. In the example shown in FIG. 11, the magnetic flux density B1 in a rotor not including the magnetic barrier 111 is indicated by the solid line, while the magnetic flux density B1 in the rotor 1 of FIG. 11 is indicated by the broken line. As shown in FIG. 11, in the rotor 1 including the magnetic barrier 111, the amplitude of the component that contributes to the torque is hardly reduced.

As described above, in the rotor 1, the fifth harmonic component can be reduced while suppressing the reduction of the amplitude of the component that contributes to the torque, as compared with a rotor not including the magnetic barriers 111. The fifth-order electromagnetic force, which is caused by the whirling motion of the rotor 1, is a main factor in an increase of vibrations. In the rotor 1, the fifth-order electromagnetic force can be reduced, which enables efficient reduction of the vibrations. Moreover, since the reduction of the amplitude of the component that contributes to the torque can be suppressed while the vibrations are reduced, reduction of the torque can be suppressed.

As described in the first embodiment above, referring to the expression (3), the magnetic flux density B2 contains the (p±1)th harmonic components caused by the whirling motion of the rotor 1. In the rotor 1 of FIG. 9, the ((p+1)×2) magnetic barriers 111 are provided in the rotor core 10. Therefore, the (p+1)th harmonic component of the magnetic flux density B2 can be reduced in a balanced manner. On the other hand, if the ((p−1)×2) magnetic barriers 111 are provided in the rotor core 10, the (p−1)th harmonic component of the magnetic flux density B2 can be reduced in a balanced manner. The (p−1)th harmonic component also increases the electromagnetic force in the diameter direction, which enhances the vibrations. In this case, the (p−1)th harmonic component of the magnetic flux density B2 can be reduced, and therefore the vibrations can be reduced. Additionally, as can be understood from the expression (3), the magnetic flux density B2 contains the (p−1)th harmonic component having a relatively large amplitude. Thus, reduction thereof enables efficient reduction of the vibrations. However, the vibration reduction effect is lower as compared with when the (p+1)th harmonic component is reduced, because the (2p+1)th-order electromagnetic force largely affects the vibrations, as described above.

In accordance with the (p±1)th harmonic components, the (((p+1)×2)+((p−1)×2)) magnetic barriers 111 may be provided in the rotor core 10. In this case, the (p±1)th harmonic components can be reduced, and thus the vibrations can be further reduced. If some of the magnetic barriers 111 corresponding to the (p+1)th harmonic component and some of the magnetic barriers 111 corresponding to the (p−1)th harmonic component are provided at positions coincident with each other in the circumferential direction, it suffices that a single magnetic barrier 111 is provided at the position for each of them.

Figure 12:
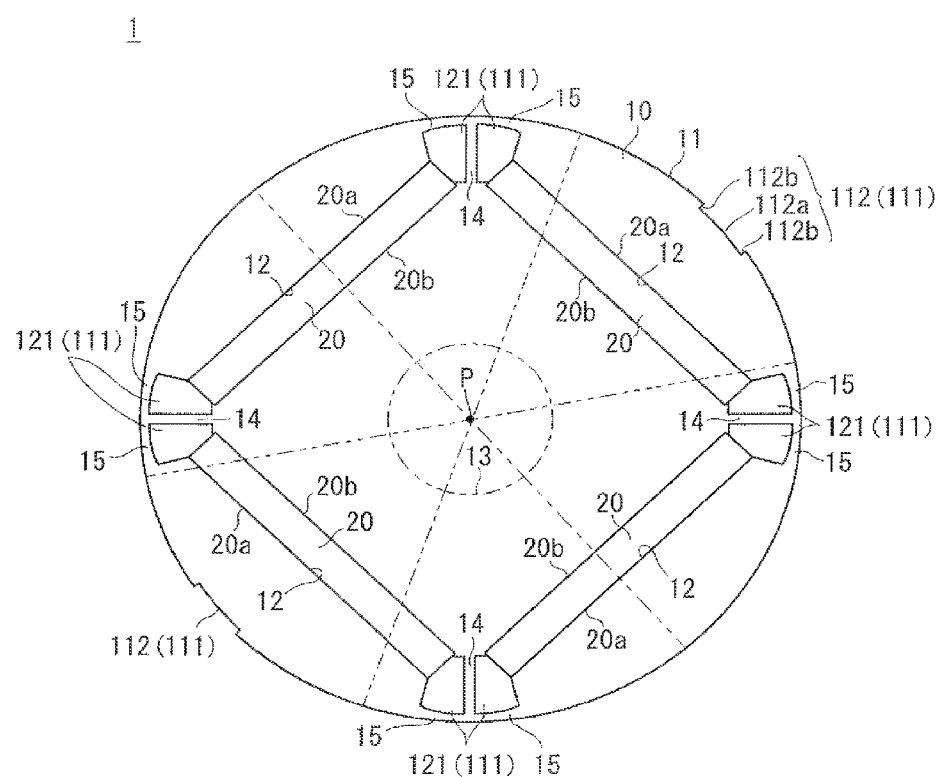
FIG. 12 is a cross-sectional view conceptually showing another example of the configuration of the rotor according to the second embodiment.

As shown in FIG. 12, the voids 121 may be recognized as the magnetic barrier 111. In an example shown in FIG. 12, the voids 121 exist in four regions among regions obtained by equally dividing the angle of the rotor core 10 into 6 (=(p+1)×2) angles around the axis P. Thus, it may be acceptable that the groove portions 112 are not provided in these four regions and the groove portions 112 are provided in the other two regions. This also can reduce the third (=(p+1))th) harmonic component of the magnetic flux density B2 in a relatively balanced manner.

Hereinafter, other aspects of the magnetic barrier 111 will be illustrated. The number of the magnetic barriers 111 and the positions thereof in the circumferential direction are identical to those of the first or second embodiment. Thus, detailed descriptions thereof will be omitted.

Third Embodiment

Figure 13:
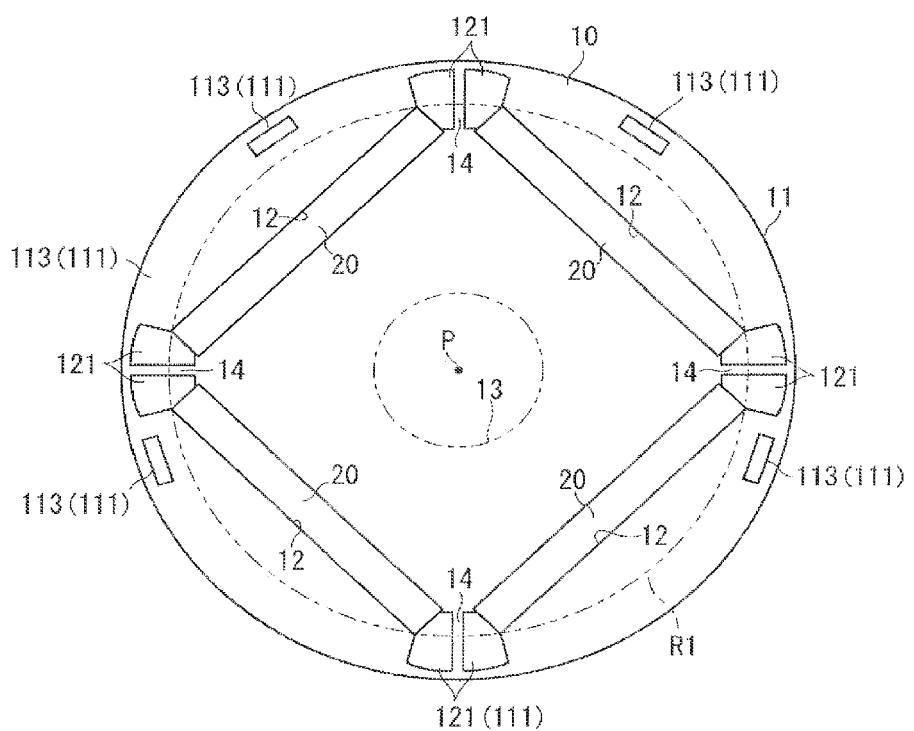
FIG. 13 is a cross-sectional view conceptually showing a configuration of a rotor according to a third embodiment.
Figure 14:
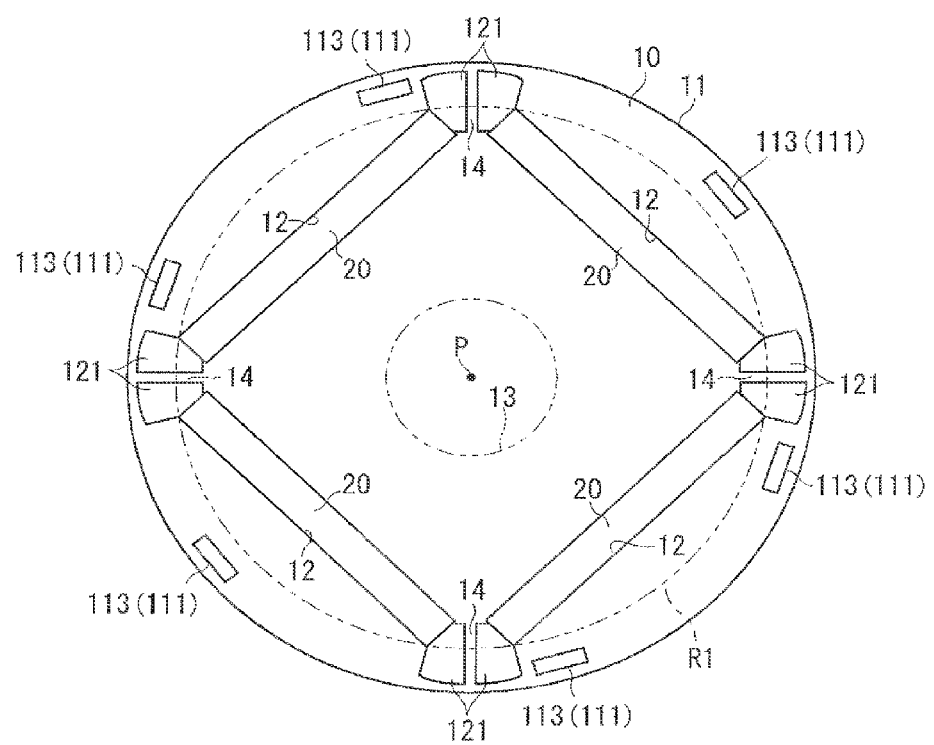
FIG. 14 is a cross-sectional view conceptually showing a configuration of the rotor according to the third embodiment.

Rotors 1 shown in FIGS. 13 and 14 is different from the rotors 1 shown in FIGS. 1 and 9, in terms of the configuration of the magnetic barrier 111.

The magnetic barriers 111 are shown as holes 113. A fluid, such as air or a cooling medium, is loaded within the holes 113. Thus, the holes 113 can function as magnetic barriers. The holes 113 are provided between the outer circumferential side surface 11 of the rotor core 10 and the permanent magnet 20 (and more specifically, between a circular ring passing through the permanent magnet 20 and the outer circumferential side surface 11). The magnetic barrier 111 is not limited to the hole 113, and the hole 113 being loaded with a non-magnetic material may be adoptable. If a non-magnetic material is loaded, the strength of the rotor 1 can be improved.

In the examples shown in FIGS. 13 and 14, the magnetic barrier 111 (hole 113) has an elongated shape when seen in the axial direction, and is arranged with the long side thereof being in contact to the circumferential direction. In a case where the voids 121 are bored in the rotor core 10, for example, the voids 121 may function as one of the magnetic barriers 111, as shown in FIG. 13. The same applies to the rotor 1 illustrated in FIG. 14. In the example shown in FIG. 14, for example, the four holes 113 adjacent to the voids 121 may not be provided, and the voids 121 may be recognized as the magnetic barriers 111.

Similarly to the first or second embodiment, such magnetic barriers 111 can also reduce the vibrations caused by the whirling motion of the rotor 1. The positions of the magnetic barriers 111 in the diameter direction are desirably close to the outer circumferential side surface 11 of the rotor core 10. This is because if magnetic fluxes flow between the outer circumference and the magnetic barriers 111, the effect of the reduction of the (2p+1)th harmonic component of the electromagnetic force is weakened.

Figure 15:
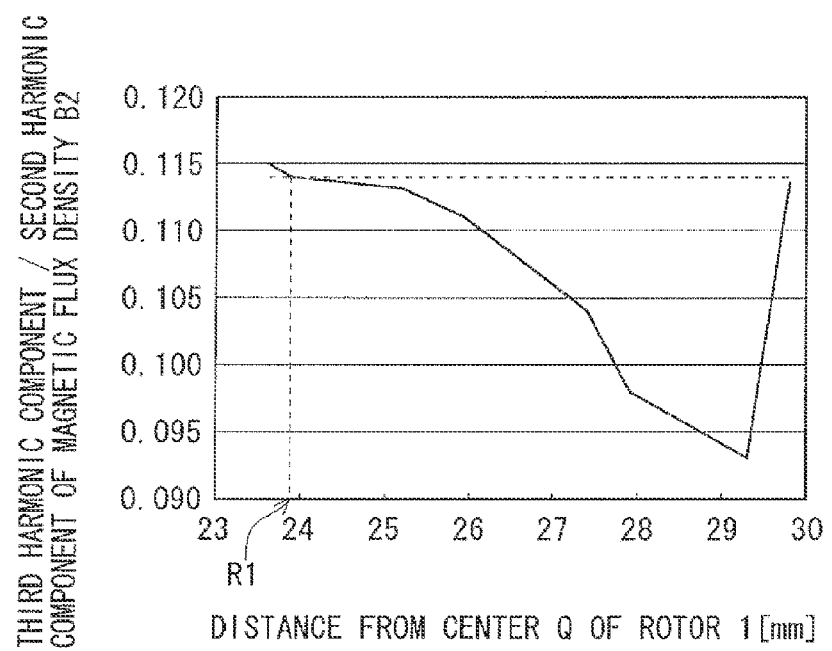
FIG. 15 is a graph showing a relationship between a distance from a center to a magnetic barrier and the ratio of a third harmonic component to a component of a magnetic flux density that contributes to a torque.

FIG. 15 shows a relationship between a distance from the center Q2 of the rotor 1 shown in FIG. 14 to the magnetic barrier 111 and the ratio of the third harmonic component to the component (second harmonic component) of the magnetic flux density B2 that contributes to the torque. FIG. 15 shows a result concerning the rotor 1 in which the radius of the outer circumferential side surface 11 relative to the center Q2 is 29.8 mm. In a graph, data in a case where the distance between the center Q2 and the magnetic barrier 111 is 29.8 mm indicates data in a case where the magnetic barriers 111 are not provided in the rotor core 10.

As shown in FIG. 15, as the magnetic barriers 111 are closer to the outer circumferential side surface 11, the third harmonic component can be reduced. The ratio of the third harmonic component to the component that contributes to the torque in a case where the magnetic barriers 111 come into contact with a circumscribed circle R1 of the permanent magnets 20 from the outer circumferential side (that is, in a case where the distance between the center Q2 and the magnetic barrier 111 is equal to the radius of the circumscribed circle R1) is equal to that in a case where the magnetic barriers 111 are not provided. As a result, it is demanded that the magnetic barriers 111 be positioned between the circumscribed circle R1 of the permanent magnets 20 and the outer circumferential side surface 11. This is also applicable to the rotor 1 illustrated in FIG. 13.

In the rotors 1 of FIGS. 13 and 14, the magnetic barriers 111 are provided between the outer circumferential side surface 11 and the permanent magnets 20, and thus it is not necessary to form a groove in the outer circumferential side surface 11. Therefore, measurement of the air gap can be performed at any position in the circumferential direction of the outer circumferential side surface 11. In other words, the magnetic barriers 111 do not hinder the measurement of the air gap. This can improve a working efficiency in the measurement of the air gap.

Fourth Embodiment

Figure 16:
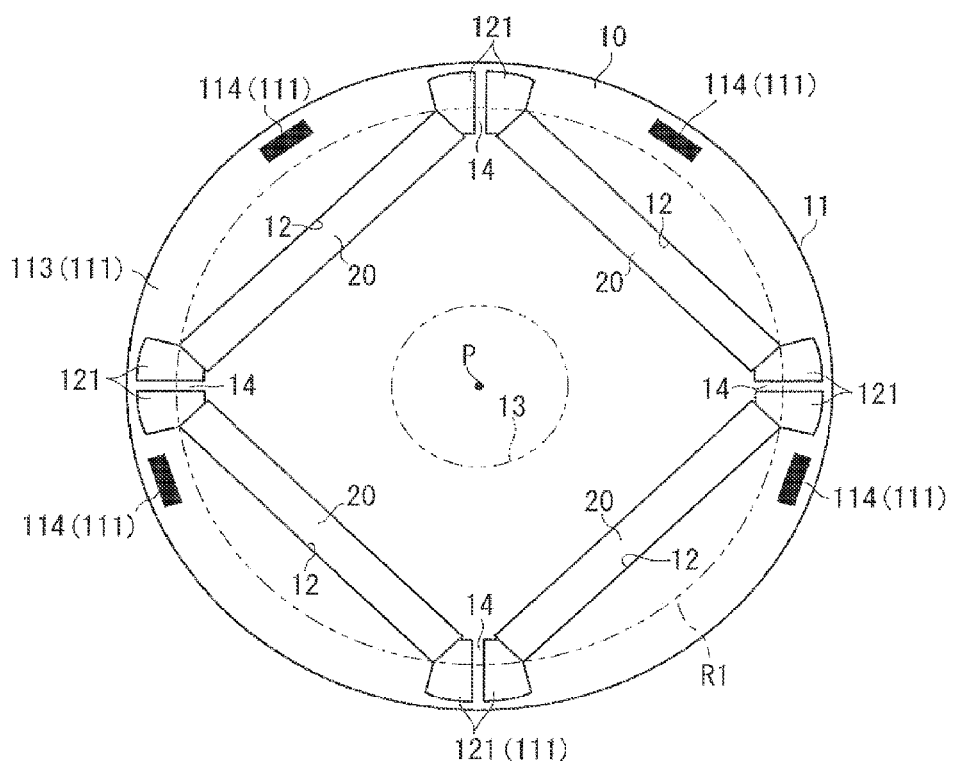
FIG. 16 is a cross-sectional view conceptually showing a configuration of the rotor according to the third embodiment.

Rotors 1 shown in FIGS. 16 and 17 are different from the rotors 1 shown in FIGS. 1 and 9, in terms of the configuration of the magnetic barrier 111.

The rotor core 10 is formed by a plurality of electromagnetic steel plates being stacked in the axial direction. The plurality of electromagnetic steel plates are fixed to one another by concavities and convexities formed therein being engaged with one another. The concavities and convexities are formed by pushing a predetermined member into the electromagnetic steel plates in the axial direction so that a concavity can be formed on one surface while a convexity can be formed at the corresponding position on the other surface. In this manner, the concavities and convexities are formed by deformation of the electromagnetic steel plates. Thus, magnetic characteristics are deteriorated in the concavities and convexities. Additionally, a convexity of one electromagnetic steel plate and a concavity that is in contact with the convexity in the axial direction are not completely continuous. Therefore, the magnetic characteristics is deteriorated in a boundary therebetween.

In consideration of the deterioration of the magnetic characteristics, in the rotors 1 shown in FIGS. 16 and 17, concavities and convexities 114 that fix the electromagnetic steel plates to one another are adopted as the magnetic barriers 111. In FIG. 16, the concavities and convexities 114 are positioned in the manner similar to the first embodiment with respect to the circumferential direction, and additionally positioned in the manner similar to the third embodiment with respect to the diameter direction. In FIG. 17, the concavities and convexities 114 are positioned in the manner similar to the second embodiment with respect to the circumferential direction, and additionally positioned in the manner similar to the third embodiment with respect to the diameter direction. However, in a case where the capability of the concavities and convexities 114 as the magnetic barrier is smaller than the capability of the holes 113 as the magnetic barrier, it is preferable that the concavities and convexities 114 are positioned at the side close to the outer circumferential side surface 11 relative to the circumscribed circle R1 of the permanent magnets 20.

This can reduce the vibrations of the rotor 1, and moreover can improve the working efficiency in the measurement of the air gap similarly to the third embodiment. Furthermore, the magnetic barriers 111 exhibit the function for fixing the plurality of electromagnetic steel plates to one another and the function as the magnetic barriers for reducing the vibrations. This can reduce manufacturing costs, as compared with providing a special fixing part and a special magnetic barrier for exhibiting the respective functions.

Similarly to the first or second embodiment, the voids 121 may be recognized as the magnetic barrier 111. In an example shown in FIG. 16, for example, the voids 121 implement the function of one magnetic barrier 111. In an example shown in FIG. 17, the four concavities and convexities 114 adjacent to the voids 121 may not be provided, and the voids 121 may be recognized as the magnetic barriers 111. Here, the number of the concavities and convexities 114 which serve to fix the electromagnetic steel plates to one another increases, a larger force is applied for fixing the electromagnetic steel plates. Therefore, it is desirable to the number of the concavities and convexities 114 provided is to some extent.

Fifth Embodiment

The rotors 1 described in the first to fourth embodiments are used in, for example, a motor for a hermetic type compressor. FIG. 18 is a vertical cross-sectional view of a compressor to which the above-described motor is applied. The compressor shown in FIG. 18 is a high pressure dome type rotary compressor in which, for example, carbon dioxide is adopted as a cooling medium. In FIG. 18, an accumulator K100 is also shown.

This compressor includes a closed container K1, a compressor mechanism K2, and a motor K3. The compressor mechanism K2 is arranged within the closed container K1. The motor K3 is arranged within the closed container K1 and at the upper side of the compressor mechanism K2. Here, the upper side means the upper side along a central axis of the closed container K1, irrespective of whether or not the central axis of the closed container K1 is inclined with respect to a horizontal plane.

The motor K3 drives the compressor mechanism K2 through a rotating shaft K4. The motor K3 includes the rotor 1 and a stator 3.

An inlet pipe K11 is connected to a side of a lower portion of the closed container K1, and an outlet pipe K12 is connected to an upper portion of the closed container K1. A cooling medium gas (not shown) is supplied from the accumulator K100 through the inlet pipe K11 to the closed container K1, and guided to a suction side of the compressor mechanism K2. This rotary compressor is a vertical type, and has an oil reservoir at least at a lower side the motor K3.

The stator 3 is arranged at the outer circumferential side of the rotating shaft K4 relative to the rotor 1, and is fixed to the closed container K1.

The compressor mechanism K2 includes a cylindrical main body K20, an upper edge plate K8, and a lower edge plate K9. The upper edge plate K8 and the lower edge plate K9 are mounted to upper and lower opening ends of the main body K20, respectively. The rotating shaft K4 extends through the upper edge plate K8 and the lower edge plate K9, and is inserted within the main body K20. The rotating shaft K4 is rotatably supported by a bearing K21 provided to the upper edge plate K8 and a bearing K22 provided to the lower edge plate K9.

The rotating shaft K4 is provided with a crankpin K5 within the main body K20. A piston K6 is driven in engagement with the crankpin K5. A compression chamber K7 is formed between the piston K6 and a cylinder corresponding thereto. The piston K6 rotates or revolves while being decentered, to change the volume of the compression chamber K7.

Next, an operation of the above-described rotary compressor will be described. A cooling medium gas is supplied from the accumulator K100 through the inlet pipe K11 to the compression chamber K7. The motor K3 drives the compressor mechanism K2 to compress the cooling medium gas. The compressed cooling medium gas is, together with a refrigerant oil (not shown), transported from the compressor mechanism K2 to the upper side of the compressor mechanism K2 through an outlet hole K23, further passes through the motor K3, and is discharged through the outlet pipe K12 to the outside of the closed container K1.

The cooling medium gas as well as the refrigerant oil moves upward within the motor K3. The cooling medium gas is guided to the upper side of the motor K3, while the refrigerant oil moves to an inner wall of the closed container K1 due to a centrifugal force produced by the rotor 1. The refrigerant oil in a state of fine particles adheres to the inner wall of the closed container K1 to be thereby liquefied, and then, due to the action of gravity, returns to an upstream of the flow of the cooling medium gas in the motor K3.

If the rotor 1 according to any of the first to fourth embodiments is adopted as the rotor 1 of the motor K3 in the foregoing hermetic type compressor, vibrations of the rotor 1 can be reduced and therefore vibrations of the hermetic type compressor can be reduced.

While the invention has been described in detail, the foregoing description is in all aspects illustrative and the present invention is not limited thereto. It will be appreciated that numerous modifications not illustrated herein can be made without departing from the scope of the present invention.

The invention claimed is:

1. A rotor comprising:
   a plurality of permanent magnets arranged annularly around a predetermined axis; and
   a rotor core including 2N (where N is a natural number) magnetic pole faces and a plurality of magnetic barriers, said 2N magnetic pole faces producing, due to said plurality of permanent magnets, magnetic poles in a radial direction centered on said predetermined axis, said magnetic poles producing different polarities alternately around said predetermined axis,
   said plurality of magnetic barriers being provided at a side close to said magnetic pole faces relative to said plurality of permanent magnets, and at least one of said plurality of magnetic barriers exists in each region obtained by equally dividing said rotor core into (2N+1) angles around said predetermined axis.

2. The rotor according to claim 1, wherein
   said plurality of magnetic barriers are provided at regular intervals in a circumferential direction centered on said predetermined axis.

3. The rotor according to claim 1, wherein
   said plurality of magnetic barriers are configured as groove portions provided on said magnetic pole faces.

* * * * *